US012307749B2

(12) United States Patent
Zhao

(10) Patent No.: US 12,307,749 B2
(45) Date of Patent: May 20, 2025

(54) METHOD, SYSTEM AND APPARATUS FOR TRAINING OBJECT RECOGNITION MODEL

(71) Applicant: INSPUR SUZHOU INTELLIGENT TECHNOLOGY CO., LTD., Jiangsu (CN)

(72) Inventor: Xudong Zhao, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 331 days.

(21) Appl. No.: 18/012,936

(22) PCT Filed: Jul. 29, 2021

(86) PCT No.: PCT/CN2021/109199
§ 371 (c)(1),
(2) Date: Dec. 25, 2022

(87) PCT Pub. No.: WO2022/052656
PCT Pub. Date: Mar. 17, 2022

(65) Prior Publication Data
US 2023/0267710 A1    Aug. 24, 2023

(30) Foreign Application Priority Data
Sep. 11, 2020  (CN) .......................... 202010956031.X

(51) Int. Cl.
*G06V 10/774* (2022.01)
*G06F 17/16* (2006.01)
(Continued)

(52) U.S. Cl.
CPC ............ *G06V 10/774* (2022.01); *G06F 17/16* (2013.01); *G06N 3/084* (2013.01); *G06V 10/48* (2022.01);
(Continued)

(58) Field of Classification Search
CPC .... G06V 10/774; G06V 10/48; G06V 10/776; G06V 10/82; G06V 10/955; G06V 10/40;
(Continued)

(56) References Cited

U.S. PATENT DOCUMENTS 10,551,846 B1 *   2/2020   Kim .................... G05D 1/0246
10,872,297 B2 *  12/2020   Kim ...................... G06V 20/41
(Continued)

FOREIGN PATENT DOCUMENTS

CN        111368997 A      7/2020
CN        111401521 A      7/2020
(Continued)

OTHER PUBLICATIONS

PCT/CN2021/109199 international search report.

*Primary Examiner* — Michael S Osinski
(74) *Attorney, Agent, or Firm* — IPro, PLLC

(57) ABSTRACT

A method, system and apparatus for training an object recognition model. The method includes: pre-storing a parameter matrix in a memory; during a model training process, inputting sample pictures into a deep learning model to obtain sample feature vectors; extracting, from the parameter matrix, feature vectors corresponding to the sample pictures, randomly extracting a certain number of feature vectors from the remaining part of the parameter matrix, and reconstructing a new parameter matrix by means of all the extracted feature vectors; multiplying the sample feature vectors by the new parameter matrix; and then calculating a loss function, then performing gradient back propagation, updating parameters of the new parameter matrix and of the deep learning model, and updating a total parameter matrix in the memory on the basis of the updated new parameter matrix.

20 Claims, 3 Drawing Sheets

(51) Int. Cl.
  *G06N 3/084* (2023.01)
  *G06V 10/48* (2022.01)
  *G06V 10/776* (2022.01)
  *G06V 10/82* (2022.01)
  *G06V 10/94* (2022.01)

(52) U.S. Cl.
  CPC ............ *G06V 10/776* (2022.01); *G06V 10/82* (2022.01); *G06V 10/955* (2022.01)

(58) Field of Classification Search
  CPC .. G06V 40/168; G06V 40/172; G06V 10/764; G06V 10/454; G06V 10/761; G06V 20/41; G06V 20/58; G06V 10/7715; G06V 20/46; G06V 20/56; G06V 20/695; G06V 20/698; G06V 10/25; G06F 17/16; G06F 18/253; G06F 18/214; G06F 18/22; G06F 18/2413; G06F 18/217; G06F 18/24; G06F 16/583; G06F 18/213; G06N 3/084; G06N 3/0464; G06N 3/063; G06N 3/045; G06N 3/08; G06N 3/047; G06N 3/044; G06N 3/088; G06N 20/10; G06N 3/04; G06T 2207/20084; G06T 2207/20081
  See application file for complete search history.

(56) References Cited

U.S. PATENT DOCUMENTS

| | | | | |
|---|---|---|---|---|
| 11,120,276 | B1* | 9/2021 | Zhang | G06V 10/454 |
| 11,227,182 | B2* | 1/2022 | Li | G06N 3/08 |
| 11,270,028 | B1* | 3/2022 | Chen | H04L 9/008 |
| 11,494,595 | B2* | 11/2022 | Wu | G06F 18/217 |
| 11,568,645 | B2* | 1/2023 | Lempitsky | G06N 3/088 |
| 11,816,882 | B2* | 11/2023 | Irie | G06F 18/2415 |
| 12,100,192 | B2* | 9/2024 | Bai | G06N 3/08 |
| 2008/0298691 | A1* | 12/2008 | Zhang | G06F 18/2453 |
| | | | | 382/228 |
| 2010/0177956 | A1* | 7/2010 | Cooper | G06V 20/70 |
| | | | | 382/159 |
| 2014/0010410 | A1* | 1/2014 | Sakurai | G06F 18/24 |
| | | | | 382/103 |
| 2018/0032840 | A1* | 2/2018 | Yu | G06V 10/774 |
| 2018/0157916 | A1* | 6/2018 | Doumbouya | G06V 40/103 |
| 2018/0189650 | A1* | 7/2018 | Wang | G06N 3/04 |
| 2019/0080148 | A1* | 3/2019 | He | G06V 10/764 |
| 2019/0164047 | A1* | 5/2019 | ter Haar Romenij | G06V 10/764 |
| 2019/0183429 | A1* | 6/2019 | Sung | A61B 5/7267 |
| 2019/0362220 | A1* | 11/2019 | Yap | G06N 3/045 |
| 2019/0377979 | A1* | 12/2019 | Jiang | G06F 18/217 |
| 2020/0151309 | A1* | 5/2020 | Thuillier | G06V 10/82 |
| 2020/0242478 | A1* | 7/2020 | Kim | G06F 18/2113 |
| 2020/0250514 | A1* | 8/2020 | Kim | G06F 18/251 |
| 2020/0265218 | A1* | 8/2020 | Dai | G06V 10/764 |
| 2020/0410241 | A1* | 12/2020 | Sundareson | A63F 13/44 |
| 2020/0411164 | A1* | 12/2020 | Donner | G06V 10/82 |
| 2021/0114627 | A1* | 4/2021 | McCurrie | G06N 3/047 |
| 2021/0174133 | A1* | 6/2021 | Nitsch | G06V 10/806 |
| 2021/0232932 | A1* | 7/2021 | Liu | G06V 10/774 |
| 2021/0279505 | A1* | 9/2021 | Zhong | G07G 1/0063 |
| 2021/0303903 | A1* | 9/2021 | Watanabe | G06N 3/08 |
| 2021/0350117 | A1* | 11/2021 | Kedarisetti | G06F 18/23213 |
| 2021/0350176 | A1* | 11/2021 | Klaiman | G06F 18/214 |
| 2021/0357705 | A1* | 11/2021 | Sung | G06V 10/454 |
| 2021/0358115 | A1* | 11/2021 | Hever | G06T 7/0008 |
| 2021/0374525 | A1* | 12/2021 | Bremer | G06F 18/214 |
| 2022/0067386 | A1* | 3/2022 | Rotman | G06N 3/08 |
| 2022/0101626 | A1* | 3/2022 | Lenga | G06V 10/776 |
| 2022/0139072 | A1* | 5/2022 | Klaiman | G06V 10/764 |
| | | | | 382/159 |
| 2022/0237788 | A1* | 7/2022 | Shaul | G16H 50/70 |
| 2022/0245777 | A1* | 8/2022 | Lu | G06T 5/50 |
| 2022/0269893 | A1* | 8/2022 | Dammu | G06V 10/454 |
| 2022/0284695 | A1* | 9/2022 | Watanabe | G06F 16/532 |
| 2022/0366670 | A1* | 11/2022 | Kim | G06V 10/454 |
| 2023/0298334 | A1* | 9/2023 | Ren | G06N 3/084 |
| | | | | 382/156 |

FOREIGN PATENT DOCUMENTS

| | | |
|---|---|---|
| CN | 111611880 A | 9/2020 |
| CN | 112115997 A | 12/2020 |

* cited by examiner

METHOD, SYSTEM AND APPARATUS FOR TRAINING OBJECT RECOGNITION MODEL

CROSS-REFERENCE TO RELATED APPLICATION

The present disclosure claims the priority of the Chinese patent application filed on Sep. 11, 2020 before the CNIPA, China National Intellectual Property Administration with the application number of 202010956031.X and the title of "METHOD, SYSTEM AND APPARATUS FOR TRAINING OBJECT RECOGNITION MODEL", which is incorporated herein in its entirety by reference.

FIELD

The present disclosure relates to the field of model training and, more particularly, to a training method, system and device for an object recognition model.

BACKGROUND

With the high-speed development of a deep learning model in the field of computer vision, a face recognition technology has been significantly progressed, the precision of the model has basically reached the human recognition level, and therefore, it has been widely applied to application scenarios such as entrance guard attendance.

In a training process of an existing face recognition model, a training method which is generally adopted includes: inputting a face picture into a deep learning model, and outputting, by the deep learning model, a feature vector for representing feature information of the input picture; then, multiplying this feature vector and a parameter matrix (used for representing respective feature information of a plurality of identities) forming a linear relationship with the total sum of the identities; then, calculating a loss function; and finally, performing back propagation of a gradient, and updating all parameters in the parameter matrix and the deep learning model.

However, the size of the parameter matrix is linearly increased with the increment of the total sum of the identities. If each identity is represented by a 128-dimensional vector, when there are a billion of identities in total, the parameter matrix needs to take up memory space ($10^9*128*4B=0.5$ TB) which is about 0.5 TB, and a Graphics Processing Unit (GPU) for model training calculation has been unable to store all data of the parameter matrix.

At present, when a billion-level face recognition model is trained, a model parallel method is generally adopted, that is, a complete parameter matrix is split onto a plurality of GPUs, and a calculated result is stipulated after calculation is completed on each GPU. However, the problem that the GPU is unable to store the parameter matrix due to the overlarge data volume may not be effectively solved even if the model parallel method is adopted; moreover, there is a great calculated quantity on the GPU, which causes a slower model training process.

Therefore, how to provide a solution for solving the above-mentioned technical problems is a problem to be solved by the skilled in the art at present.

SUMMARY

The objective of the present disclosure is to provide a training method, system and device for an object recognition model. A parameter matrix used for calculation during model training is a part of parameter matrix extracted from the original parameter matrix, and the data volume of the part of parameter matrix extracted is smaller, so that the calculated quantity is reduced, and the model training process is accelerated; moreover, the original parameter matrix is stored in an internal memory having larger storage space, and thus, the problem that the parameter matrix may not be stored due to the overlarge data volume is effectively solved.

In order to solve the above-mentioned technical problems, the present disclosure provides a training method for an object recognition model, including:
  pre-storing a parameter matrix composed of a plurality of feature vectors for representing object feature information into an internal memory;
  inputting sample pictures into a deep learning model for object recognition during model training to obtain sample feature vectors for representing feature information of the sample pictures;
  extracting the feature vectors corresponding to the sample pictures from the parameter matrix, randomly extracting a certain number of feature vectors from a remaining parameter matrix, and reconstructing all extracted feature vectors to be a new parameter matrix;
  multiplying the sample feature vectors and the new parameter matrix to obtain a similarity between each of the sample feature vectors and each feature vector in the new parameter matrix; and
  calculating a loss function according to the similarity, performing back propagation of a gradient on the basis of the loss function, updating parameters of the new parameter matrix and the deep learning model, and updating a total parameter matrix in the internal memory on the basis of the updated new parameter matrix to complete this round of training of the deep learning model.

In an embodiment, the process of pre-storing the parameter matrix composed of the plurality of feature vectors for representing object feature information into the internal memory includes:
  randomly initializing a parameter matrix with a size of emb_size×cls_size and used for representing feature information of a plurality of sample pictures, and storing the parameter matrix into the internal memory, wherein emb_size is a size of a feature vector representing the feature information of one of the sample pictures, and cls_size is a total quantity of the sample pictures.

In an embodiment, the training method for the object recognition model further includes:
  pre-storing the plurality of sample pictures into a dataset, and configuring sample Identity Documents IDs for the plurality of sample pictures one by one; and
  correspondingly, the process of inputting sample pictures into the deep learning model for object recognition to obtain sample feature vectors for representing feature information of the sample pictures; extracting the feature vectors corresponding to the sample pictures from the parameter matrix, randomly extracting the certain number of feature vectors from the remaining parameter matrix, and reconstructing all the extracted feature vectors to be the new parameter matrix includes:
  randomly acquiring a batch of target sample Identity Documents IDs from all the sample Identity Documents IDs, and acquiring corresponding target sample pictures from the dataset on the basis of the target sample Identity Documents IDs;

inputting the target sample pictures into the deep learning model for object recognition to obtain sample feature vectors for representing feature information of the target sample pictures; and randomly acquiring a certain number of random sample Identity Documents IDs from the remaining sample Identity Documents IDs, extracting the feature vectors corresponding to the target sample Identity Documents IDs and the random sample Identity Documents IDs from the parameter matrix, and reconstructing all the extracted feature vectors to be the new parameter matrix.

In an embodiment, the process of this round of training of the deep learning model includes:

pre-allocating different sample pictures for different Graphics Processing Units GPUs;

inputting sample pictures corresponding to a target Graphics Processing Unit GPU into the deep learning model for object recognition to obtain target sample feature vectors for representing feature information of the sample pictures, wherein the target Graphics Processing Unit GPU is any one of the Graphics Processing Units GPUS;

extracting the feature vectors corresponding to all sample pictures allocated for all the Graphics Processing Units GPUs from the parameter matrix, randomly extracting a certain number of feature vectors from a remaining parameter matrix, and reconstructing all the extracted feature vectors to be the new parameter matrix;

multiplying the target sample feature vectors and the new parameter matrix by utilizing the target Graphics Processing Unit GPU to obtain a target similarity between each of the target sample feature vectors and each feature vector in the new parameter matrix, calculating a target loss function according to the target similarity, and performing back propagation of a gradient on the basis of the target loss function to obtain a gradient of to-be-updated parameter values of the new parameter matrix and the deep learning model; and solving an average value of the gradient of the to-be-updated parameter values corresponding to all the Graphics Processing Units GPUs, updating parameters of the new parameter matrix and the deep learning model according to the average value of the gradient of the to-be-updated parameter values, and updating a total parameter matrix in the internal memory on the basis of the updated new parameter matrix to complete this round of training of the deep learning model.

In an embodiment, the training method for the object recognition model further includes:

after a previous round of training of the deep learning model is completed, determining whether the deep learning model satisfies a requirement for model precision of object recognition;

when the deep learning model satisfies the requirement for the model precision of the object recognition, determining that the training of the deep learning model is ended; and when the deep learning model does not satisfy the requirement for the model precision of the object recognition, re-inputting new sample pictures into the deep learning model for object recognition to perform a new round of training.

In an embodiment, the deep learning model is a convolutional neural network model.

In order to solve the above-mentioned technical problems, the present disclosure further provides a training system for an object recognition model, including:

a matrix storage module configured to pre-store a parameter matrix composed of a plurality of feature vectors for representing object feature information into an internal memory;

a vector acquisition module configured to input sample pictures into a deep learning model for object recognition during model training to obtain sample feature vectors for representing feature information of the sample pictures;

a matrix reconstruction module configured to extract the feature vectors corresponding to the sample pictures from the parameter matrix, randomly extract a certain number of feature vectors from a remaining parameter matrix, and reconstruct all extracted feature vectors to be a new parameter matrix;

a similarity acquisition module configured to multiply the sample feature vectors and the new parameter matrix to obtain a similarity between each of the sample feature vectors and each feature vector in the new parameter matrix; and a parameter updating module configured to calculate a loss function according to the similarity, perform back propagation of a gradient on the basis of the loss function, update parameters of the new parameter matrix and the deep learning model, and update a total parameter matrix in the internal memory on the basis of the updated new parameter matrix to complete this round of training of the deep learning model.

In an embodiment, the matrix storage module is configured to:

randomly initialize a parameter matrix with a size of emb_size×cls_size and used for representing feature information of a plurality of sample pictures, and store the parameter matrix into the internal memory, wherein emb_size is a size of a feature vector representing the feature information of one of the sample pictures, and cls_size is a total quantity of the sample pictures.

In an embodiment, the training system for the object recognition model further includes:

an Identity Document ID configuration module configured to pre-store the plurality of sample pictures into a dataset, and configure sample Identity Documents IDs for the plurality of sample pictures one by one; and correspondingly, the vector acquisition module is configured to:

randomly acquire a batch of target sample Identity Documents IDs from all the sample Identity Documents IDs, and acquire corresponding target sample pictures from the dataset on the basis of the target sample Identity Documents IDs; and input the target sample pictures into the deep learning model for object recognition to obtain sample feature vectors for representing feature information of the target sample pictures; and the matrix reconstruction module is configured to:

randomly acquire a certain number of random sample Identity Documents IDs from the remaining sample Identity Documents IDs, extract the feature vectors corresponding to the target sample Identity Documents IDs and the random sample Identity Documents IDs from the parameter matrix, and reconstruct all extracted feature vectors to be a new parameter matrix.

In order to solve the above-mentioned technical problems, the present disclosure further provides a training device for an object recognition model, including:

a memory configured to store a computer program; and a processor configured to implement, when executing the computer program, the steps of the training method for the object recognition model according to any one stated above.

The present disclosure provides a training method for an object recognition model, including: pre-storing a parameter matrix into an internal memory; inputting sample pictures into a deep learning model during model training to obtain sample feature vectors; extracting the feature vectors corresponding to the sample pictures from the parameter matrix, randomly extracting a certain number of feature vectors from a remaining parameter matrix, and reconstructing all extracted feature vectors to be a new parameter matrix; multiplying the sample feature vectors and the new parameter matrix to obtain a similarity between each of the sample feature vectors and each feature vector in the new parameter matrix; and calculating a loss function according to the similarity, performing back propagation of a gradient on the basis of the loss function, updating parameters of the new parameter matrix and the deep learning model, and updating a total parameter matrix in the internal memory on the basis of the updated new parameter matrix to complete this round of training of the deep learning model. It is thus clear that the parameter matrix used for calculation during model training is a part of parameter matrix extracted from the original parameter matrix, and the data volume of the part of parameter matrix extracted is smaller, so that the calculated quantity is reduced, and the model training process is accelerated; moreover, the original parameter matrix is stored in the internal memory having larger storage space, and thus, the problem that the parameter matrix may not be stored due to the overlarge data volume is effectively solved.

The present disclosure further provides a training system and device for an object recognition model, which have the same beneficial effects as the above-mentioned training method.

BRIEF DESCRIPTION OF THE DRAWINGS

In order to more clearly explain the technical solution in the embodiment or the existing technology of the present disclosure, the following will briefly introduce the drawings that need to be used in the embodiment or the existing technology description. Obviously, the drawings in the following description are only the embodiment of the present disclosure. For a person skilled in the art, other drawings may be obtained according to the provided drawings without paying creative labor.

DETAILED DESCRIPTION

The core of the present disclosure is to provide a training method, system and device for an object recognition model.

A parameter matrix used for calculation during model training is a part of parameter matrix extracted from the original parameter matrix, and the data volume of the part of parameter matrix extracted is smaller, so that the calculated quantity is reduced, and the model training process is accelerated; moreover, the original parameter matrix is stored in an internal memory having larger storage space, and thus, the problem that the parameter matrix may not be stored due to the overlarge data volume is effectively solved.

In order to make objectives, technical solutions and advantages of the embodiments of the present disclosure clearer, the technical solutions in the embodiments of the present disclosure will be described clearly and completely below in conjunction with the accompanying drawings in the embodiments of the present disclosure. Obviously, the described embodiments are a part of the embodiments of the present disclosure, not all the embodiments. Based on the embodiments in the present disclosure, all other embodiments obtained by those of ordinary skill in the art without creative work shall fall within the protective scope of the present disclosure.

Figure 1:
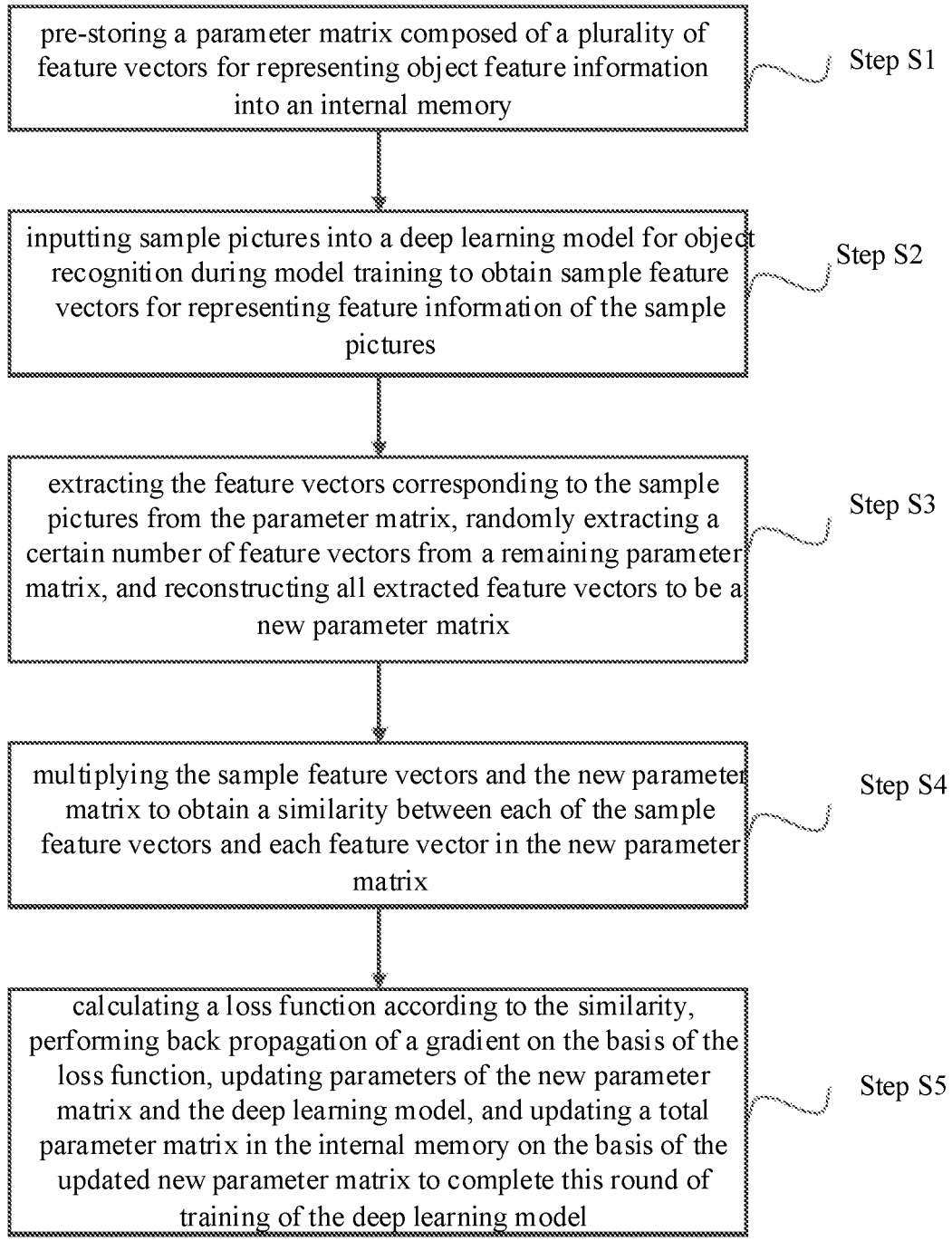
FIG. 1 is a flow chart of a training method for an object recognition model provided in an embodiment of the present disclosure.

With reference to FIG. 1, FIG. 1 is a flow chart of a training method for an object recognition model provided in an embodiment of the present disclosure.

The training method for the object recognition model includes:

step S1: a parameter matrix composed of a plurality of feature vectors for representing object feature information is pre-stored into an internal memory.

In some embodiments of the present disclosure, in view of the situation that the storage space of the internal memory is much larger than the storage space of GPU equipment, according to the present disclosure, a complete parameter matrix composed of the plurality of feature vectors for representing the object feature information is stored into the internal memory in advance, so that the problem that the parameter matrix may not be stored due to the overlarge data volume is effectively solved.

It may be understood that one of the feature vectors in the parameter matrix stored in the internal memory correspondingly represents the feature information of one of the pictures, the complete parameter matrix corresponds to a plurality of pictures basically being billion-level pictures, and sample pictures required for subsequently training a deep learning model for object recognition need to be selected from these pictures.

Step S2: sample pictures are input into a deep learning model for object recognition during model training to obtain sample feature vectors for representing feature information of the sample pictures.

In some embodiments of the present disclosure, during the training of the deep learning model, firstly, the sample pictures required for this round of training are acquired from the plurality of pictures corresponding to the parameter matrix stored in the internal memory, then, the sample pictures are input into the deep learning model, and the sample feature vectors for representing feature information of the sample pictures may be output by the deep learning model so as to be used for subsequent calculation.

Step S3: the feature vectors corresponding to the sample pictures are extracted from the parameter matrix, a certain number of feature vectors are randomly extracted from a remaining parameter matrix, and all extracted feature vectors are reconstructed to be a new parameter matrix.

In some embodiments of the present disclosure, in view of the situation that the parameter matrix participating in calculation in the prior art is a complete parameter matrix stored in the internal memory and requires a great calculated quantity, the new parameter matrix relatively small in data volume is reconstructed in the present disclosure, so that the calculated quality is reduced, and the model training process is accelerated.

In some embodiments of the present disclosure, the process that the new parameter matrix is reconstructed includes: on one hand, the feature vectors (referred to as first feature vectors) corresponding to the sample pictures are extracted from the complete parameter matrix stored in the internal memory; and on the other hand, a certain number of feature vectors (referred to as second feature vectors) are randomly extracted from the remaining parameter matrix (a parameter matrix formed by remaining feature vectors other than the feature vectors corresponding to the sample pictures in the complete parameter matrix stored in the internal memory), and then, all the extracted feature vectors are reconstructed to be the new parameter matrix (the first feature vectors+the second feature vectors) so as to be used for subsequent calculation.

Step S4: the sample feature vectors and the new parameter matrix are multiplied to obtain a similarity between each of the sample feature vectors and each feature vector in the new parameter matrix.

In some embodiments of the present disclosure, according to the present disclosure, after the sample feature vectors output by the deep learning model and the reconstructed new parameter matrix are obtained, the sample feature vectors and the new parameter matrix are multiplied to obtain the similarity between each of the sample feature vectors and each feature vector in the new parameter matrix.

Step S5: a loss function is calculated according to the similarity, back propagation of a gradient is performed on the basis of the loss function, parameters of the new parameter matrix and the deep learning model are updated, and a total parameter matrix in the internal memory is updated on the basis of the updated new parameter matrix to complete this round of training of the deep learning model.

In some embodiments of the present disclosure, according to the present disclosure, the loss function may be calculated according to the similarity between each of the sample feature vectors and each feature vector in the new parameter matrix, back propagation of the gradient is performed on the basis of the loss function, the new parameter matrix is updated, the total parameter matrix in the internal memory is updated on the basis of the updated new parameter matrix, then, back propagation of the gradient is further performed, the parameters of the deep learning model are updated, and then, this round of training of the deep learning model is ended.

Figure 2:
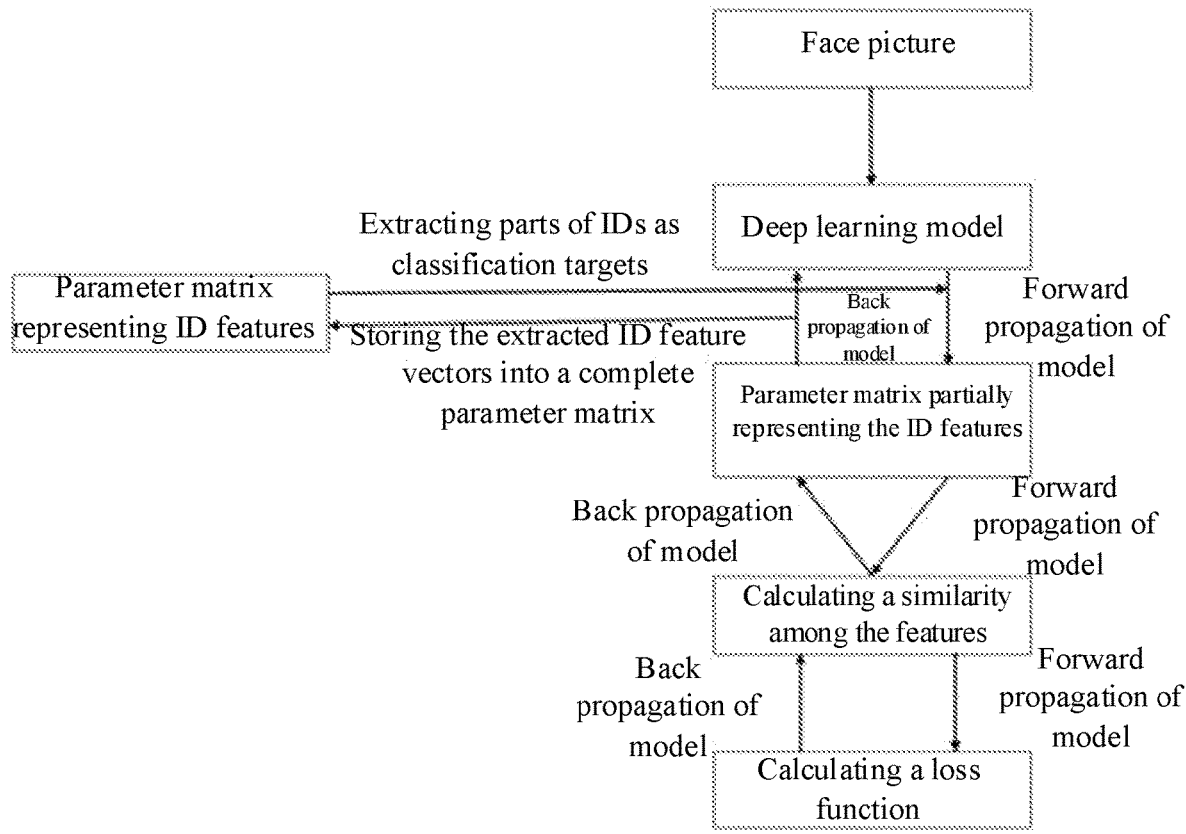
FIG. 2 is a flow chart of a training method for a face recognition model provided in an embodiment of the present disclosure.

It should be noted that, as shown in FIG. 2, the deep learning model in the present disclosure may be applied to face recognition.

The present disclosure provides a training method for an object recognition model, including: a parameter matrix is pre-stored into an internal memory; sample pictures are input into a deep learning model during model training to obtain sample feature vectors; the feature vectors corresponding to the sample pictures are extracted from the parameter matrix, a certain number of feature vectors are randomly extracted from a remaining parameter matrix, and a new parameter matrix is reconstructed by using all the extracted feature vectors; the sample feature vectors and the new parameter matrix are multiplied to obtain a similarity between each of the sample feature vectors and each feature vector in the new parameter matrix; and a loss function is calculated according to the similarity, back propagation of a gradient is performed on the basis of the loss function, parameters of the new parameter matrix and the deep learning model are updated, and a total parameter matrix in the internal memory is updated on the basis of the updated new parameter matrix to complete this round of training of the deep learning model. It is thus clear that the parameter matrix used for calculation during model training is a part of parameter matrix extracted from the original parameter matrix, and the data volume of the part of parameter matrix extracted is smaller, so that the calculated quantity is reduced, and the model training process is accelerated; moreover, the original parameter matrix is stored in the internal memory having larger storage space, and thus, the problem that the parameter matrix may not be stored due to the overlarge data volume is effectively solved.

On the basis of the above-mentioned embodiment:
in an embodiment of the present disclosure, the process that the parameter matrix composed of the plurality of feature vectors for representing object feature information is pre-stored into the internal memory includes:
a parameter matrix with a size of emb_size×cls_size and used for representing feature information of a plurality of sample pictures is randomly initialized, and the parameter matrix is stored into the internal memory, wherein emb_size is a size of a feature vector representing the feature information of one of the sample pictures, and cls_size is the total quantity of the sample pictures.

In some embodiments of the present disclosure, the size of the complete parameter matrix always stored in the internal memory is: emb_size×cls_size, wherein emb_size is the size of one of the feature vectors, and cls_size is the total quantity of the feature vectors included in the complete parameter matrix. An initial value of the parameter matrix is randomly generated, one of the feature vectors is used for representing the feature information of one of the sample pictures, and then, the complete parameter matrix corresponds to cls_size pictures.

Based on this, the data volume of the new parameter matrix reconstructed in the present disclosure is m×emb_size×4B, wherein m is the total quantity of the feature vectors included in the new parameter matrix, and m is much smaller than cls_size.

In an embodiment of the present disclosure, the training method for the object recognition model further includes:
the plurality of sample pictures are pre-stored into a dataset, and sample IDs are configured for the plurality of sample pictures one by one; and
correspondingly, the process that sample pictures are input into a deep learning model for object recognition to obtain sample feature vectors for representing feature information of the sample pictures; the feature vectors corresponding to the sample pictures are extracted from the parameter matrix, the certain number of feature vectors are randomly extracted from the remaining parameter matrix, and all the extracted feature vectors are reconstructed to be a new parameter matrix includes:
a batch of target sample IDs are randomly acquired from all the sample IDs, and corresponding target sample pictures are acquired from the dataset on the basis of the target sample IDs;
the target sample pictures are input into the deep learning model for object recognition to obtain sample feature vectors for representing feature information of the target sample pictures; and a certain number of random sample IDs are randomly acquired from the remaining sample IDs, the feature vectors corresponding to the target sample IDs and the random sample IDs are extracted from the parameter matrix, and a new parameter matrix is reconstructed by using all the extracted feature vectors.

In an embodiment, according to the present disclosure, the plurality of sample pictures corresponding to the complete parameter matrix stored in the internal memory may be stored into the dataset in advance, and the sample Identity Documents IDs are configured for the plurality of sample pictures one by one, which is equivalent to that a label is configured for each sample picture, thereby facilitating the subsequent acquisition of the required sample pictures.

Based on this, the process that the sample feature vectors used for subsequent calculation are acquired includes: according to the present disclosure, a batch of sample IDs (referred to as target sample IDs) may be randomly acquired from all the sample IDs, and corresponding sample pictures (referred to as target sample pictures), namely sample pictures required for this round of training of the deep learning model, are acquired from the dataset on the basis of the target sample IDs; and then, the target sample pictures are input into the deep learning model to obtain sample feature vectors for representing feature information of the target sample pictures.

The process that the new parameter matrix used for subsequent calculation is acquired includes: on one hand, a batch of sample IDs (referred to as target sample IDs) are randomly acquired from all the sample IDs; on the other hand, a certain number of sample IDs (referred to as random sample IDs) are randomly acquired from the remaining sample IDs (the remaining sample IDs other than the target sample IDs in all the sample IDs), then, the feature vectors corresponding to the target sample IDs and the random sample IDs are extracted from the complete parameter matrix stored in the internal memory, and all the extracted feature vectors are reconstructed to be a new parameter matrix.

In an embodiment of the present disclosure, the process of this round of training of the deep learning model includes: different sample pictures are pre-allocated for different Graphics Processing Units (GPUs);
  sample pictures corresponding to a target GPU are input into the deep learning model for object recognition to obtain target sample feature vectors for representing feature information of the sample pictures, wherein the target GPU is any one of the GPUs;
  the feature vectors corresponding to all the sample pictures allocated for all the GPUs are extracted from the parameter matrix, a certain number of feature vectors are randomly extracted from a remaining parameter matrix, and a new parameter matrix is reconstructed by using all the extracted feature vectors;
  the target sample feature vectors and the new parameter matrix are multiplied by utilizing the target GPU to obtain a target similarity between each of the target sample feature vectors and each feature vector in the new parameter matrix, a target loss function is calculated according to the target similarity, and back propagation of a gradient is performed on the basis of the target loss function to obtain a gradient of to-be-updated parameter values of the new parameter matrix and the deep learning model; and
  an average value of the gradient of the to-be-updated parameter values corresponding to all the GPUs is solved, parameters of the new parameter matrix and the deep learning model are updated according to the average value of the gradient of the to-be-updated parameter values, and a total parameter matrix in the internal memory is updated on the basis of the updated new parameter matrix to complete this round of training of the deep learning model.

In some embodiments of the present disclosure, according to the present disclosure, the plurality of GPUs are adopted to participate in the training of the deep learning model. The training process of the deep learning model includes: different sample pictures are pre-allocated for different GPUs (for example, there are two GPUs participating in model training, sample picture 1 and sample picture 2 are allocated for GPU 1, and sample picture 3 and sample picture 4 are allocated for GPU 2); the sample pictures corresponding to any one of the GPUs (referred to as a target GPU) are input into the deep learning model to obtain target sample feature vectors for representing feature information of the sample pictures; the feature vectors corresponding to all the sample pictures allocated for all the GPUs (for example, all the sample pictures are sample pictures 1, 2, 3 and 4, and the sample pictures 1, 2, 3 and 4 correspond to feature vectors 1, 2, 3 and 4) are extracted from the complete parameter matrix stored in the internal memory, a certain number of feature vectors (such as feature vectors 5, 6, 7 and 8) are randomly extracted from a remaining parameter matrix, all the extracted feature vectors (such as feature vectors 1, 2, 3, 4, 5, 6, 7 and 8) are reconstructed to be the new parameter matrix, and the new parameter matrix is transmitted to the target GPU; the target sample feature vectors and the new parameter matrix are multiplied by utilizing the target GPU to obtain a target similarity between each of the target sample feature vectors and each feature vector in the new parameter matrix; a target loss function is calculated according to the target similarity, and back propagation of a gradient is performed on the basis of the target loss function to obtain a gradient of to-be-updated parameter values of the new parameter matrix and the deep learning model; and an average value of the gradient of the to-be-updated parameter values corresponding to all the GPUs is solved, parameters of the new parameter matrix and the deep learning model are updated according to the average value of the gradient of the to-be-updated parameter values, a total parameter matrix in the internal memory is updated on the basis of the updated new parameter matrix, and thus, this round of training of the deep learning model is ended.

In an embodiment of the present disclosure, the training method for the object recognition model further includes:
  after a previous round of training of the deep learning model is completed, it is determined whether the deep learning model satisfies a requirement for model precision of object recognition;
  when the deep learning model satisfies the requirement for the model precision of the object recognition, it is determined that the training of the deep learning model is ended; and
  when the deep learning model does not satisfy the requirement for the model precision of the object recognition, new sample pictures are re-input into the deep learning model for object recognition to perform a new round of training.

In an embodiment, according to the present disclosure, after the previous round of training of the deep learning model is completed, it may be further determined whether the deep learning model satisfies a requirement for model precision of object recognition; if the deep learning model has satisfied the requirement for model precision of object recognition, it is proven that the deep learning model does not need to be further trained and may be directly put into use, and therefore, it is determined that the training of the deep learning model is ended; and if the deep learning model has not satisfied the requirement for model precision of object recognition, it is proven that the deep learning model needs to be further trained and may not be directly put into use, and therefore, new sample pictures are re-input into the deep learning model to perform the next round of training until the deep learning model satisfies the requirement for model precision of object recognition, and then, the training of the deep learning model is ended.

In an embodiment of the present disclosure, the deep learning model is a convolutional neural network model.

In some embodiments of the present disclosure, the deep learning model in the present disclosure may select, but is not limited to the convolutional neural network model (such as a ResNet model and a SqueezeNet model), which is not limited herein.

Figure 3:
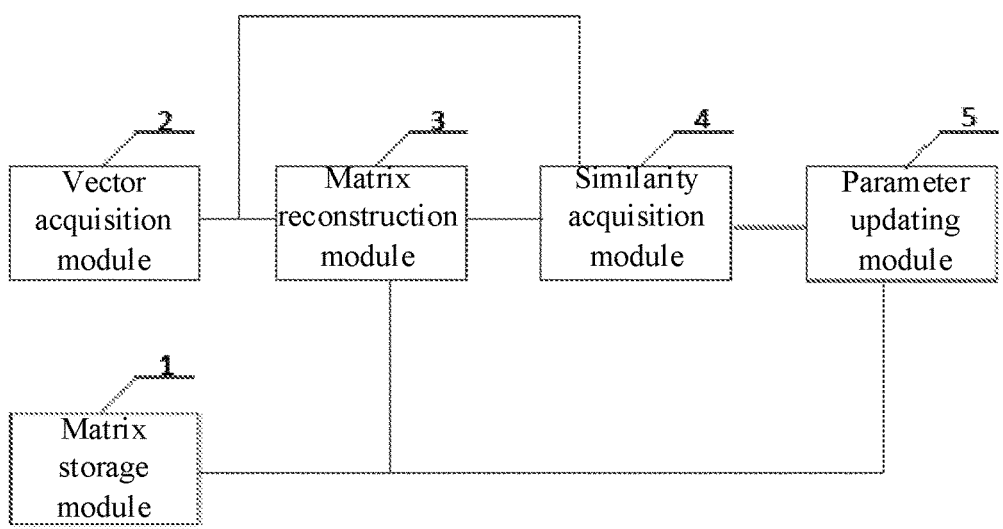
FIG. 3 is a schematic structural diagram of a training system for an object recognition model provided in an embodiment of the present disclosure.

With reference to FIG. 3, FIG. 3 is a schematic structural diagram of a training system for an object recognition model provided in an embodiment of the present disclosure.

The training system for the object recognition model includes:
a matrix storage module 1 configured to pre-store a parameter matrix composed of a plurality of feature vectors for representing object feature information into an internal memory;
a vector acquisition module 2 configured to input sample pictures into a deep learning model for object recognition during model training to obtain sample feature vectors for representing feature information of the sample pictures;
a matrix reconstruction module 3 configured to extract the feature vectors corresponding to the sample pictures from the parameter matrix, randomly extract a certain number of feature vectors from a remaining parameter matrix, and reconstruct all extracted feature vectors to be a new parameter matrix;
a similarity acquisition module 4 configured to multiply the sample feature vectors and the new parameter matrix to obtain a similarity between each of the sample feature vectors and each feature vector in the new parameter matrix; and
a parameter updating module 5 configured to calculate a loss function according to the similarity, perform back propagation of a gradient on the basis of the loss function, update parameters of the new parameter matrix and the deep learning model, and update a total parameter matrix in the internal memory on the basis of the updated new parameter matrix to complete this round of training of the deep learning model.

In an embodiment of the present disclosure, the matrix storage module 1 is configured to:
randomly initialize a parameter matrix with a size of emb_size×cls_size and used for representing feature information of a plurality of sample pictures, and store the parameter matrix into the internal memory, wherein emb_size is a size of a feature vector representing the feature information of one of the sample pictures, and cls_size is a total quantity of the sample pictures.

In an embodiment of the present disclosure, the training system for the object recognition model further includes:
an ID configuration module configured to pre-store the plurality of sample pictures in a dataset, and configure sample IDs for the plurality of sample pictures one by one;

correspondingly, the vector acquisition module 2 is configured to:
randomly acquire a batch of target sample IDs from all the sample IDs, and acquire corresponding target sample pictures from the dataset on the basis of the target sample IDs; and input the target sample pictures into the deep learning model for object recognition to obtain sample feature vectors for representing feature information of the target sample pictures; and
the matrix reconstruction module 3 is configured to:
randomly acquire a certain number of random sample IDs from the remaining sample IDs, extract the feature vectors corresponding to the target sample IDs and the random sample IDs from the parameter matrix, and reconstruct all extracted feature vectors to be a new parameter matrix.

The introduction of the training system provided in the present disclosure refers to that in the embodiment of the above-mentioned training method, the descriptions thereof will be omitted herein.

The present disclosure further provides a training device for an object recognition model, including: a memory configured to store a computer program; and
a processor configured to implement, when executing the computer program, the steps of the training method for the object recognition model according to any one mentioned above.

The introduction of the training device provided in the present disclosure refers to that in the embodiment of the above-mentioned training method, the descriptions thereof will be omitted herein.

Figure 4:
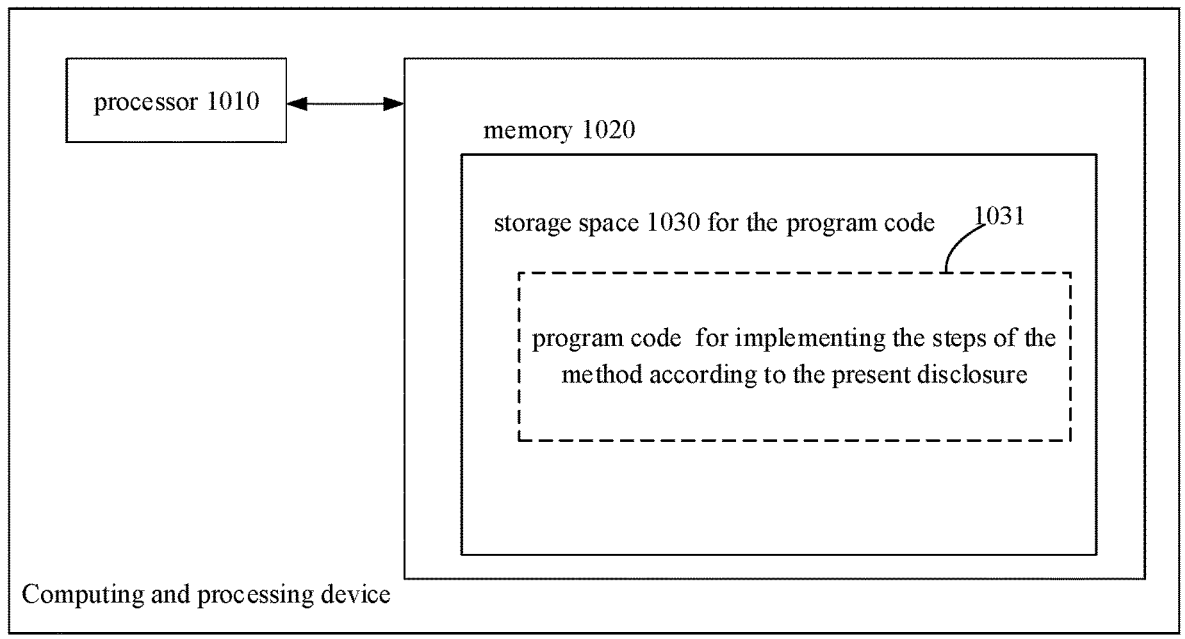
FIG. 4 schematically shows a block diagram of a service orchestration apparatus for executing the method according to the present disclosure.
Figure 5:
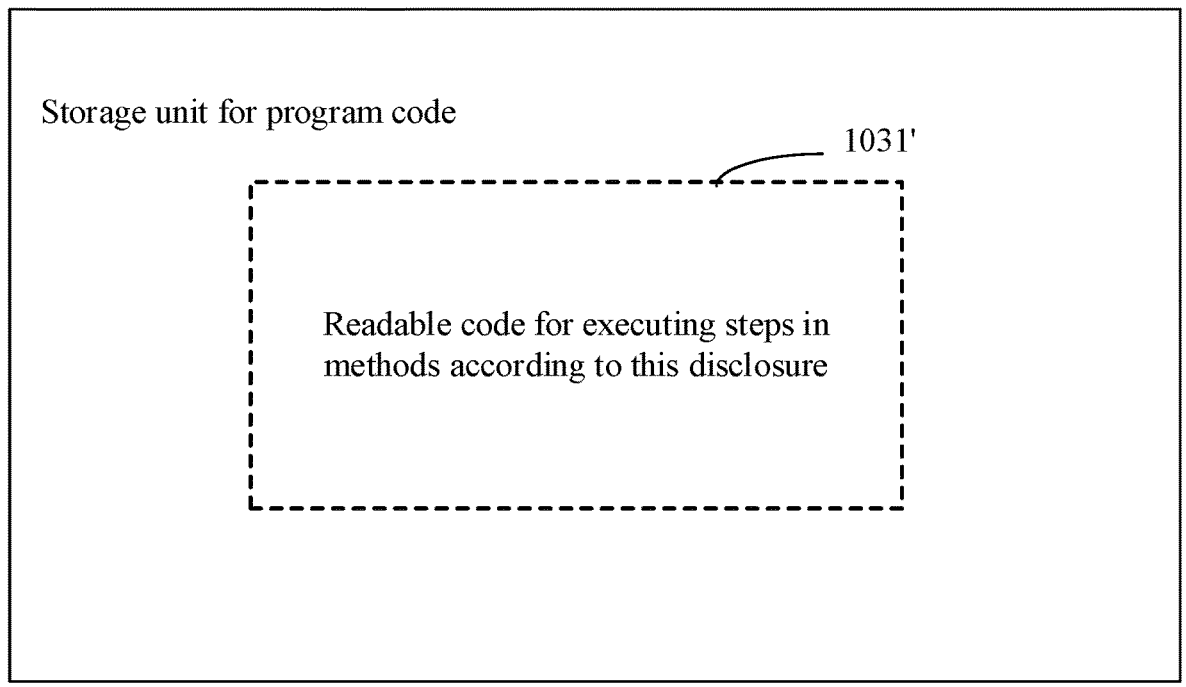
FIG. 5 schematically shows a storage unit for holding or carrying program codes for implementing the method according to the present disclosure.

For example, FIG. 4 shows a computing and processing device that can implement the method according to the present disclosure. The computing and processing device traditionally includes a processor 1010 and a computer program product or computer-readable medium in the form of a memory 1020. The memory 1020 may be electronic memories such as flash memory, EEPROM (Electrically Erasable Programmable Read Only Memory), EPROM, hard disk or ROM. The memory 1020 has the storage space 1030 of the program code 1031 for implementing any steps of the above method. For example, the storage space 1030 for program code may contain program codes 1031 for individually implementing each of the steps of the above method. Those program codes may be read from one or more computer program products or be written into the one or more computer program products. Those computer program products include program code carriers such as a hard disk, a compact disk (CD), a memory card or a floppy disk. Such computer program products are usually portable or fixed storage units as shown in FIG. 5. The storage unit may have storage segments or storage spaces with similar arrangement to the memory 1020 of the computing and processing device in FIG. 4. The program codes may, for example, be compressed in a suitable form. Generally, the storage unit contains a computer-readable code 1031', which can be read by a processor like 1010. When those codes are executed by the computing and processing device, the codes cause the computing and processing device to implement each of the steps of the method described above.

It should also be noted that the relational terms such as "first" and "second" in the present specification are used solely to distinguish one entity or operation from another entity or operation without necessarily requiring or implying any actual such relationship or order between such entities or operations. Furthermore, the terms like "include", "include", or any other variations thereof, are intended to indicate a non-exclusive inclusion, such that a process, method, article, or apparatus that includes a list of elements does not include only those elements but may include other elements not expressly listed or inherent to such process, method, article, or apparatus. An element defined by a phrase like "includes a . . . " does not, without further constraints, preclude the existence of additional identical elements in the process, method, article, or apparatus that includes the element.

The above description of the embodiments disclosed enables a person skilled in the art may realize and use the present disclosure. Various modifications to these embodiments will be obvious to a person skilled in the art. The general principles defined herein may be realized in other embodiments without breaking away from the spirit or scope of the present disclosure. Therefore, the present disclosure will not be limited to these embodiments shown in this specification, but to conform to the widest range consistent with the principles and novel features disclosed in this specification.

The invention claimed is:

1. A training method for an object recognition model, comprising:
   pre-storing a parameter matrix composed of a plurality of feature vectors for representing object feature information into an internal memory;
   inputting sample pictures into a deep learning model for object recognition during model training to obtain sample feature vectors for representing feature information of the sample pictures;
   extracting the feature vectors corresponding to the sample pictures from the parameter matrix, randomly extracting a certain number of feature vectors from a remaining parameter matrix, and reconstructing all extracted feature vectors to be a new parameter matrix;
   multiplying the sample feature vectors and the new parameter matrix to obtain a similarity between each of the sample feature vectors and each feature vector in the new parameter matrix; and
   calculating a loss function according to the similarity, performing back propagation of a gradient on the basis of the loss function, updating parameters of the new parameter matrix and the deep learning model, and updating a total parameter matrix in the internal memory on the basis of the updated new parameter matrix to complete this round of training of the deep learning model.

2. The training method for the object recognition model according to claim 1, wherein the process of pre-storing the parameter matrix composed of the plurality of feature vectors for representing object feature information into the internal memory comprises:
   randomly initializing a parameter matrix with a size of emb_size×cls_size and used for representing feature information of a plurality of sample pictures, and storing the parameter matrix into the internal memory, wherein emb_size is a size of a feature vector representing the feature information of one of the sample pictures, and cls_size is a total quantity of the sample pictures.

3. The training method for the object recognition model according to claim 2, wherein the training method for the object recognition model further comprises:
   pre-storing the plurality of sample pictures into a dataset, and configuring sample Identity Documents IDs for the plurality of sample pictures one by one; and correspondingly, the process of inputting sample pictures into the deep learning model for object recognition to obtain sample feature vectors for representing feature information of the sample pictures; extracting the feature vectors corresponding to the sample pictures from the parameter matrix, randomly extracting the certain number of feature vectors from the remaining parameter matrix, and reconstructing all the extracted feature vectors to be the new parameter matrix comprises:
   randomly acquiring a batch of target sample Identity Documents IDs from all the sample Identity Documents IDs, and acquiring corresponding target sample pictures from the dataset on the basis of the target sample Identity Documents IDs;
   inputting the target sample pictures into the deep learning model for object recognition to obtain sample feature vectors for representing feature information of the target sample pictures; and
   randomly acquiring a certain number of random sample Identity Documents IDs from the remaining sample Identity Documents IDs, extracting the feature vectors corresponding to the target sample Identity Documents IDs and the random sample Identity Documents IDs from the parameter matrix, and reconstructing all the extracted feature vectors to be the new parameter matrix.

4. The training method for the object recognition model according to claim 1, wherein the process of this round of training of the deep learning model comprises:
   pre-allocating different sample pictures for different Graphics Processing Units GPUs;
   inputting sample pictures corresponding to a target Graphics Processing Unit GPU into the deep learning model for object recognition to obtain target sample feature vectors for representing feature information of the sample pictures, wherein the target Graphics Processing Unit GPU is any one of the Graphics Processing Units GPUs;
   extracting the feature vectors corresponding to all sample pictures allocated for all the Graphics Processing Units GPUs from the parameter matrix, randomly extracting a certain number of feature vectors from a remaining parameter matrix, and reconstructing all the extracted feature vectors to be the new parameter matrix;
   multiplying the target sample feature vectors and the new parameter matrix by utilizing the target Graphics Processing Unit GPU to obtain a target similarity between each of the target sample feature vectors and each feature vector in the new parameter matrix, calculating a target loss function according to the target similarity, and performing back propagation of a gradient on the basis of the target loss function to obtain a gradient of to-be-updated parameter values of the new parameter matrix and the deep learning model; and
   solving an average value of the gradient of the to-be-updated parameter values corresponding to all the Graphics Processing Units GPUs, updating parameters of the new parameter matrix and the deep learning model according to the average value of the gradient of the to-be-updated parameter values, and updating a total parameter matrix in the internal memory on the basis of the updated new parameter matrix to complete this round of training of the deep learning model.

5. The training method for the object recognition model according to claim 1, wherein the training method for the object recognition model further comprises:

after a previous round of training of the deep learning model is completed, determining whether the deep learning model satisfies a requirement for model precision of object recognition;

when the deep learning model satisfies the requirement for the model precision of the object recognition, determining that the training of the deep learning model is ended; and when the deep learning model does not satisfy the requirement for the model precision of the object recognition, re-inputting new sample pictures into the deep learning model for object recognition to perform a new round of training.

6. The training method for the object recognition model according to claim 1, wherein the deep learning model is a convolutional neural network model.

7. The training method for the object recognition model according to claim 6, wherein the convolutional neural network model comprises at least one of a ResNet model and a SqueezeNet model.

8. The training method for the object recognition model according to claim 1, wherein one of the feature vectors in the parameter matrix stored in the internal memory correspondingly represents the feature information of one of the pictures, and the parameter matrix corresponds to a plurality of pictures.

9. The training method for the object recognition model according to claim 1, wherein during a training of the deep learning model, the sample pictures required for this round of training are acquired from the plurality of pictures corresponding to the parameter matrix stored in the internal memory, then, the sample pictures are input into the deep learning model, and the sample feature vectors for representing feature information of the sample pictures are output by the deep learning model.

10. The training method for the object recognition model according to claim 1, wherein a data volume of the new parameter matrix is m×emb_size×4B, wherein m is a total quantity of the feature vectors included in the new parameter matrix, and m is much smaller than cls_size.

11. A training system for an object recognition model, comprising:
a processor; and
a memory, storing a computer program that is executed by the processor, and upon execution by the processor, is configured to cause the processor to perform operations comprising:
storing a parameter matrix composed of a plurality of feature vectors for representing object feature information into an internal memory;
inputting sample pictures into a deep learning model for object recognition during model training to obtain sample feature vectors for representing feature information of the sample pictures;
extracting the feature vectors corresponding to the sample pictures from the parameter matrix, randomly extracting a certain number of feature vectors from a remaining parameter matrix, and reconstructing all extracted feature vectors to be a new parameter matrix;
multiplying the sample feature vectors and the new parameter matrix to obtain a similarity between each of the sample feature vectors and each feature vector in the new parameter matrix; and
calculating a loss function according to the similarity, performing back propagation of a gradient on the basis of the loss function, updating parameters of the new parameter matrix and the deep learning model, and updating a total parameter matrix in the internal memory on the basis of the updated new parameter matrix to complete this round of training of the deep learning model.

12. The training system for the object recognition model according to claim 11, wherein the operation of pre-storing a parameter matrix composed of a plurality of feature vectors for representing object feature information into an internal memory comprises:
randomly initializing a parameter matrix with a size of emb_size×cls_size and used for representing feature information of a plurality of sample pictures, and storing the parameter matrix into the internal memory, wherein emb_size is a size of a feature vector representing the feature information of one of the sample pictures, and cls_size is a total quantity of the sample pictures.

13. The training system for the object recognition model according to claim 12, wherein the operations further comprises:
pre-storing the plurality of sample pictures into a dataset, and configuring sample Identity Documents IDs for the plurality of sample pictures one by one; and
correspondingly, the operation of inputting sample pictures into a deep learning model for object recognition during model training to obtain sample feature vectors for representing feature information of the sample pictures comprises:
randomly acquiring a batch of target sample Identity Documents IDs from all the sample Identity Documents IDs, and acquiring corresponding target sample pictures from the dataset on the basis of the target sample Identity Documents IDs; and inputting the target sample pictures into the deep learning model for object recognition to obtain sample feature vectors for representing feature information of the target sample pictures; and
the operation of pre-storing a parameter matrix composed of a plurality of feature vectors for representing object feature information into an internal memory comprises:
randomly acquiring a certain number of random sample Identity Documents IDs from the remaining sample Identity Documents IDs, extracting the feature vectors corresponding to the target sample Identity Documents IDs and the random sample Identity Documents IDs from the parameter matrix, and reconstructing all extracted feature vectors to be a new parameter matrix.

14. The training system for the object recognition model according to claim 11, wherein the process of this round of training of the deep learning model comprises:
pre-allocating different sample pictures for different Graphics Processing Units GPUs;
inputting sample pictures corresponding to a target Graphics Processing Unit GPU into the deep learning model for object recognition to obtain target sample feature vectors for representing feature information of the sample pictures, wherein the target Graphics Processing Unit GPU is any one of the Graphics Processing Units GPUs;
extracting the feature vectors corresponding to all sample pictures allocated for all the Graphics Processing Units GPUs from the parameter matrix, randomly extracting a certain number of feature vectors from a remaining parameter matrix, and reconstructing all the extracted feature vectors to be the new parameter matrix;
multiplying the target sample feature vectors and the new parameter matrix by utilizing the target Graphics Processing Unit GPU to obtain a target similarity between each of the target sample feature vectors and each feature vector in the new parameter matrix, calculating a target loss function according to the target similarity, and performing back propagation of a gradient on the basis of the target loss function to obtain a gradient of to-be-updated parameter values of the new parameter matrix and the deep learning model; and solving an average value of the gradient of the to-be-updated parameter values corresponding to all the Graphics Processing Units GPUs, updating parameters of the new parameter matrix and the deep learning model according to the average value of the gradient of the to-be-updated parameter values, and updating a total parameter matrix in the internal memory on the basis of the updated new parameter matrix to complete this round of training of the deep learning model.

15. The training system for the object recognition model according to claim 11, wherein the operations further comprise:

after a previous round of training of the deep learning model is completed, determining whether the deep learning model satisfies a requirement for model precision of object recognition;

when the deep learning model satisfies the requirement for the model precision of the object recognition, determining that the training of the deep learning model is ended; and when the deep learning model does not satisfy the requirement for the model precision of the object recognition, re-inputting new sample pictures into the deep learning model for object recognition to perform a new round of training.

16. The training system for the object recognition model according to claim 11, wherein the deep learning model is a convolutional neural network model.

17. A non-transitory computer readable storage medium storing computer program that, when executed by a processor, cause the processor to perform the operations comprising:

pre-storing a parameter matrix composed of a plurality of feature vectors for representing object feature information into an internal memory;

inputting sample pictures into a deep learning model for object recognition during model training to obtain sample feature vectors for representing feature information of the sample pictures;

extracting the feature vectors corresponding to the sample pictures from the parameter matrix, randomly extract a certain number of feature vectors from a remaining parameter matrix, and reconstruct all extracted feature vectors to be a new parameter matrix;

multiplying the sample feature vectors and the new parameter matrix to obtain a similarity between each of the sample feature vectors and each feature vector in the new parameter matrix; and calculating a loss function according to the similarity, performing back propagation of a gradient on the basis of the loss function, update parameters of the new parameter matrix and the deep learning model, and updating a total parameter matrix in the internal memory on the basis of the updated new parameter matrix to complete this round of training of the deep learning model.

18. The non-transitory computer readable storage medium according to claim 17, wherein the operation of pre-storing a parameter matrix composed of a plurality of feature vectors for representing object feature information into an internal memory comprises:

randomly initializing a parameter matrix with a size of emb_size×cls_size and used for representing feature information of a plurality of sample pictures, and storing the parameter matrix into the internal memory, wherein emb_size is a size of a feature vector representing the feature information of one of the sample pictures, and cls_size is a total quantity of the sample pictures.

19. The non-transitory computer readable storage medium according to claim 18, wherein the operations further comprise:

pre-storing the plurality of sample pictures into a dataset, and configuring sample Identity Documents IDs for the plurality of sample pictures one by one; and correspondingly, the operation of inputting sample pictures into a deep learning model for object recognition during model training to obtain sample feature vectors for representing feature information of the sample pictures comprises:

randomly acquiring a batch of target sample Identity Documents IDs from all the sample Identity Documents IDs, and acquiring corresponding target sample pictures from the dataset on the basis of the target sample Identity Documents IDs; and inputting the target sample pictures into the deep learning model for object recognition to obtain sample feature vectors for representing feature information of the target sample pictures; and the operation of pre-storing a parameter matrix composed of a plurality of feature vectors for representing object feature information into an internal memory comprises:

randomly acquiring a certain number of random sample Identity Documents IDs from the remaining sample Identity Documents IDs, extracting the feature vectors corresponding to the target sample Identity Documents IDs and the random sample Identity Documents IDs from the parameter matrix, and reconstructing all extracted feature vectors to be a new parameter matrix.

20. The non-transitory computer readable storage medium according to claim 17, wherein the process of this round of training of the deep learning model comprises:

pre-allocating different sample pictures for different Graphics Processing Units GPUs;

inputting sample pictures corresponding to a target Graphics Processing Unit GPU into the deep learning model for object recognition to obtain target sample feature vectors for representing feature information of the sample pictures, wherein the target Graphics Processing Unit GPU is any one of the Graphics Processing Units GPUs;

extracting the feature vectors corresponding to all sample pictures allocated for all the Graphics Processing Units GPUs from the parameter matrix, randomly extracting a certain number of feature vectors from a remaining parameter matrix, and reconstructing all the extracted feature vectors to be the new parameter matrix;

multiplying the target sample feature vectors and the new parameter matrix by utilizing the target Graphics Processing Unit GPU to obtain a target similarity between each of the target sample feature vectors and each feature vector in the new parameter matrix, calculating a target loss function according to the target similarity, and performing back propagation of a gradient on the basis of the target loss function to obtain a gradient of to-be-updated parameter values of the new parameter matrix and the deep learning model; and solving an average value of the gradient of the to-be-updated parameter values corresponding to all the Graphics Processing Units GPUs, updating parameters of the new parameter matrix and the deep learning model according to the average value of the gradient of the to-be-updated parameter values, and updating a total parameter matrix in the internal memory on the basis of the updated new parameter matrix to complete this round of training of the deep learning model.

* * * * *